United States Patent
Robinson

[11] Patent Number: 5,890,379
[45] Date of Patent: Apr. 6, 1999

[54] FISHING APPARATUS

[76] Inventor: Thomas Robinson, 148 Whitney Street, Blockhouse Ray 1230, New Zealand

[21] Appl. No.: 495,522
[22] PCT Filed: Jan. 20, 1994
[86] PCT No.: PCT/NZ94/00002
  § 371 Date: Aug. 21, 1995
  § 102(e) Date: Aug. 21, 1995
[87] PCT Pub. No.: WO94/16558
  PCT Pub. Date: Aug. 4, 1994

[30]   Foreign Application Priority Data

Jan. 23, 1993 [NZ] New Zealand ............................ 245600

[51] Int. Cl.$^6$ ..................................................... A01K 87/00
[52] U.S. Cl. ........................................................ 43/25
[58] Field of Search ........................................... 43/19, 25

[56]   References Cited

U.S. PATENT DOCUMENTS

| | | | |
|---|---|---|---|
| 2,709,315 | 5/1955 | Walter | 43/25 |
| 2,810,982 | 10/1957 | Bucciarelli | 43/25 |
| 2,846,804 | 8/1958 | Elliot | 43/25 |
| 2,963,238 | 12/1960 | Gaire | 43/25 |
| 3,050,898 | 8/1962 | Bernd | 43/25 |
| 3,057,106 | 10/1962 | Wheeler | 43/25 |
| 3,069,800 | 12/1962 | Ransom | 43/25 |
| 3,305,963 | 2/1967 | Minera | 43/25 |
| 3,309,810 | 3/1967 | Hannon | 43/25 |
| 3,344,547 | 10/1967 | Schroeder | 43/25 |
| 3,413,748 | 12/1968 | Kragh | 43/19 |
| 3,436,858 | 4/1969 | Shaffer | 43/25 |
| 3,643,367 | 2/1972 | Denny | 43/25 |
| 3,782,023 | 1/1974 | Hendrickson | 43/25 |
| 4,014,126 | 3/1977 | Sammuels | 43/19 |
| 4,051,617 | 10/1977 | Dorph | 43/25 |
| 4,682,437 | 7/1987 | Akerberg | 43/19 |
| 5,210,972 | 5/1993 | Collins | 43/25 |
| 5,430,968 | 7/1995 | Watkins | 43/25 |

FOREIGN PATENT DOCUMENTS

| | | |
|---|---|---|
| 210151 | 9/1957 | Australia . |
| 273722 | 9/1964 | Australia . |
| 412750 | 8/1968 | Australia . |
| 635941 | 12/1978 | Russian Federation . |
| 1492522 | 11/1977 | United Kingdom . |

*Primary Examiner*—Kurt Rowan
*Attorney, Agent, or Firm*—Stetina Brunda Garred & Brucker

[57]   ABSTRACT

There is described a fishing line release apparatus (1) for use when casting a fishing line (13) with a fishing rod (4), and in particular for automatically releasing the fishing line (4) when casting. The fishing line release apparatus (1) comprises a body member (2) having a mounting means for mounting the apparatus (1) relative to a fishing rod (4); inclination sensing means (10) mounted relative to the body member (2) for sensing an inclination of the fishing rod (4), and release means (12) for releasably retaining, relative to the fishing rod (4), the fishing line (13) to be cast by the fishing rod (4), the arrangement and construction being such that the release means (12) is operated to release the fishing line (13) retained thereby when the inclination sensing means (10) senses a predetermined inclination of the fishing rod (4).

15 Claims, 2 Drawing Sheets

_5,890,379_

FISHING APPARATUS

TECHNICAL FIELD

This invention relates to fishing apparatus.

In particular, the invention relates to fishing line release apparatus for use with surf casters and the like.

For the purposes of this specification, the term "casting" is understood to refer to the casting of a fishing line, and in particular surf casting.

BACKGROUND ART

Many fishermen (or anglers) utilise the technique of casting when fishing. This generally involves retaining the fishing line by a finger or thumb of the hand, and then whipping the rod forward whilst simultaneously releasing the fishing line, whereby the hook and sinker are flicked out into the waters being fished in or upon.

However, there are two main disadvantages associated with common casting methods or techniques.

The first of these is that the fishing line may cut or blister the finger or thumb of the fisherman being used for retaining the line before and during the flicking or casting motion.

The second disadvantage is that it is difficult to time the release of the fishing line simultaneously with the flick of the fishing rod. If the line is released too soon or too late then the fish hook and sinker may not travel the required or desired distance. This disadvantage is a particular problem for new or novice fishermen.

There is available a clip for attaching to a fishing rod to help overcome the first of the above disadvantages. However, the clip still requires the use of a finger or thumb to release the line, although no finger or thumb contact with the fishing line is made. The second disadvantage outlined above is therefore still present.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a fishing line release apparatus for use when casting a fishing line with a fishing rod, said apparatus comprising:

(i) a body member having a mounting means for mounting said apparatus relative to a fishing rod;

(ii) inclination sensing means mounted relative to said body member for sensing an inclination of said fishing rod, and (iii) release means for releasably retaining, relative to said fishing rod, a fishing line to be cast by said fishing rod, the arrangement and construction being such that said release means is operated to release said fishing line retained thereby when said inclination sensing means senses a predetermined inclination of said fishing rod.

According to a further aspect of the present invention there is provided a fishing line release apparatus substantially as described above wherein said release means comprises:

(ii) an operating member Which is movable between a line retaining condition wherein said line is retained relative to said fishing rod and/or said fishing line release apparatus, and a line release condition wherein said line is released, and (ii) a retaining/actuating means whereby said operating member may be retained in said line retaining condition, and only released or moved therefrom when said inclination sensing means senses a predetermined inclination of said fishing rod.

According to a further aspect of the present invention there is provided a fishing line release apparatus substantially as described above wherein said release means co-operates with a fishing reel mounted on the fishing rod to releasably retain a fishing line wound onto a spool member of the fishing reel, and whereby said operating member functions to releasably prevent said fishing line from unwinding from said spool member when the operating member is in said line retaining condition, but will allow said fishing line to unwind from said spool member when said operating member is in said line release condition.

With such an apparatus mounted on a fishing rod and releasably retaining a fishing line, the fishing line may be released when the fishing rod is at a predetermined inclination during a casting action, so that the line is cast. The release means may be set so as to operate and release the fishing line when the rod is at an inclination which results in a maximum line cast distance and also greater accuracy. Moreover, since the release point is not dependent on operator skill, even a novice fisherman can make a good cast. Moreover, since the thumb or finger of a fisherman are no longer required to retain the line during casting, injury thereto is avoided.

Any suitable means may be utilised for mounting the apparatus onto a fishing rod. Such mounting means may allow for the permanent or releasable fixture of the apparatus to a fishing rod. The mounting means may involve indirect mounting on the fishing rod by way of a fishing reel on which the apparatus is mounted or incorporated into. Preferably the mounting means may enable the apparatus to be mounted without modification of the fishing rod. For example a strap or loop may be provided which may be fitted over the fishing rod with an adjustable member provided on the body of the apparatus to enable tightening of the loop to thereby secure the body member to the fishing rod.

Preferably, the workings of the fishing line release apparatus may be mechanical. However, it is also envisaged that the apparatus may be electrically, or otherwise powered or operated. For example, the apparatus may be electrically powered and incorporate a mercury switch type mechanism which acts as an inclination sensing and activating means.

Any suitable means or mechanisms, mechanical, electrical, or a combination of the two, or otherwise, may be utilised as release means for releasably retaining the fishing line, so that the fishing line may be released at the desired or required time or at a predetermined inclination of fishing rod.

For example the release means may comprise or be provided with an operating member which is movable between a line retaining condition wherein the line is retained relative to the fishing rod or the fishing line release apparatus, and a line release condition wherein the line is released. The release means may also comprise or be provided with a retaining/actuating means or device (preferably operated by a suitable output from the inclination sensing means) whereby the operating member may be retained in the line retaining condition, and released or moved therefrom only when the inclination sensing means senses a predetermined inclination of the fishing rod.

The operating member may comprise or include a member which may protrude from the apparatus to grip or catch a portion of the fishing line, and which may be retracted from the apparatus to release the fishing line.

Alternatively in a case where the release means co-operates with a fishing reel to releasably retain a fishing line wound onto a spool of the fishing reel, the operating member may function to prevent the fishing line from unwinding from the spool member when in the line retaining condition, and to allow the fishing line to unwind from the spool when in the line release condition.

In the case of a free spooling reel where the fishing line is prevented from unwinding from the spool by the locking of the spool relative to the fishing rod, the operating member may function to releasably lock the rotation of the spool. For example the operating member may comprise a locking component of the reel. In this case the body member of the apparatus may comprise part of the body of the reel.

With a fixed spool reel where the fishing line is prevented from unwinding therefrom by supporting a portion of the fishing line at a predetermined position relative to the spool, the operating member may act to provide such support. In this case, the operating member may comprise a line retaining member. This may be of any suitable form or configuration whereby a fishing line may be supported thereby in the predetermined position relative to the spool, until such time as the predetermined inclination of the fishing rod has been reached, at which point the fishing line may be released.

The line retaining member and/or release means may incorporate or comprise a simple device such as a clip or slot into which the fishing line may be placed or inserted. Alternatively, and preferably, the line retaining member may have a line bearing surface, and be mounted relative to the fishing rod or fishing line release apparatus so as to be movable between a line retaining condition wherein the line is supported and/or retained by the line bearing surface, and a line release condition wherein the line is free to slide off or from the line bearing surface.

Such a line retaining member may be mounted by any suitable means which allows for movement between the line retaining condition and the line release condition. For example, it may be mounted so as to be slidable relative to the body member of the apparatus between the line retaining condition and the line release condition. Alternatively or in addition, it may be mounted so as to be pivotal between the line retaining condition and the line release condition. In the case of a pivotal mounting, the line bearing surface may be disposed on the line retaining member, and of such a configuration or arrangement that a line may be supported by the surface in the line retaining condition, and may slide from the surface as the line retaining member pivots to the line release condition.

Any suitable means or mechanisms, mechanical, electrical, a combination of the two or otherwise, may be utilised for retaining/actuating the operating member so that the fishing line may be released at the desired or required time or inclination of fishing rod. For example, in the case where the operating member is slidable between the line retaining condition and the line release condition, this may comprise an actuation device which actuates the operating member from the line retaining condition to the line release condition.

Alternatively, in the case where the operating member is pivotal or biased to release from the line retaining condition, such as by a load due to a tension in the fishing line, or some other biasing means, this may comprise a member which retains the operating member against the bias force until the predetermined inclination sensed by the inclination sensing means. In this case the retaining/actuating device may comprise a movable member having an engaging surface, the movable member being movable between an engaged condition wherein the engaging surface engages with a portion of the operating member, and a non-engaged condition wherein the engaging surface disengages with the portion of the operating member. With this arrangement, a retaining/actuating device may be provided with a device for maintaining the movable member in an engaged condition until a predetermined inclination of the fishing rod is sensed by the inclination sensor.

Any suitable means may be utilised for sensing the inclination of the fishing rod when it is at a suitable inclination for release of the fishing line. For example, this may comprise an element such as a ball/roller, pendulum or liquid, which moves relative to a supporting surface with inclination of the supporting surface. Such a sensing means may be adjustable so that the timing of the release of the fishing line and/or line retaining member may be adjusted as required, desired or as dictated by the type of rod or casting technique of a fisherman. In the case of a pendulum, this may be adjustably attached to a pivot shaft which may be rotatably mounted relative to the fishing rod. The pendulum may thus swing with a casting motion of the fishing rod, and the inclination of the fishing rod may be sensed as a rotation of the pivot shaft.

In the case of a fishing line release apparatus for use with a fixed spool reel as described above, the device for maintaining the movable member of the retaining/actuating device may comprise a surface formed on and/or relative to the pivot shaft. This surface may be arranged to bear against a bearing surface formed on and/or relative to the movable member. The movable member may thus be maintained in an engaged condition over a predetermined swing of the pendulum, and allowed to move towards the non-engaged condition when a predetermined inclination of the pendulum is reached.

With such an arrangement, the surface formed on said pivot shaft may be substantially concentric with an axis or the pendulum (for example) over a predetermined arc. The surface may be provided with a recess formed therein for accommodating the bearing surface of the movable member. This recess may be provided at a predetermined angle with respect to an axis of the pendulum mounted on the shaft, the predetermined angle being determined by the required angle of inclination for release of the fishing line. Adjustment of the angle may be achieved by relocating the pendulum on the pivot shaft.

In the case of a liquid in the inclination sensing device, the arrangement may be such, as with a mercury switch, wherein the switch is switched on or off at a predetermined inclination. In this case the movable member of the retaining/actuating device may be maintained in the engaged condition by a resilient urging force, and be movable from the engaged condition under the force of an electric solenoid which may be switched on or off by operation of a mercury switch connected thereto. The solenoid may thus be operated at a predetermined inclination of the mercury switch to thus cause the movable member to move from the engaged condition to the non-engaged condition, and to thereby release the line retaining member and hence the fishing line.

Further aspects of the present invention will become apparent from the ensuing description which is given by way of example only and with reference to the accompanying drawings.

BEST MODES FOR CARRYING OUT THE INVENTION

Figure 1:
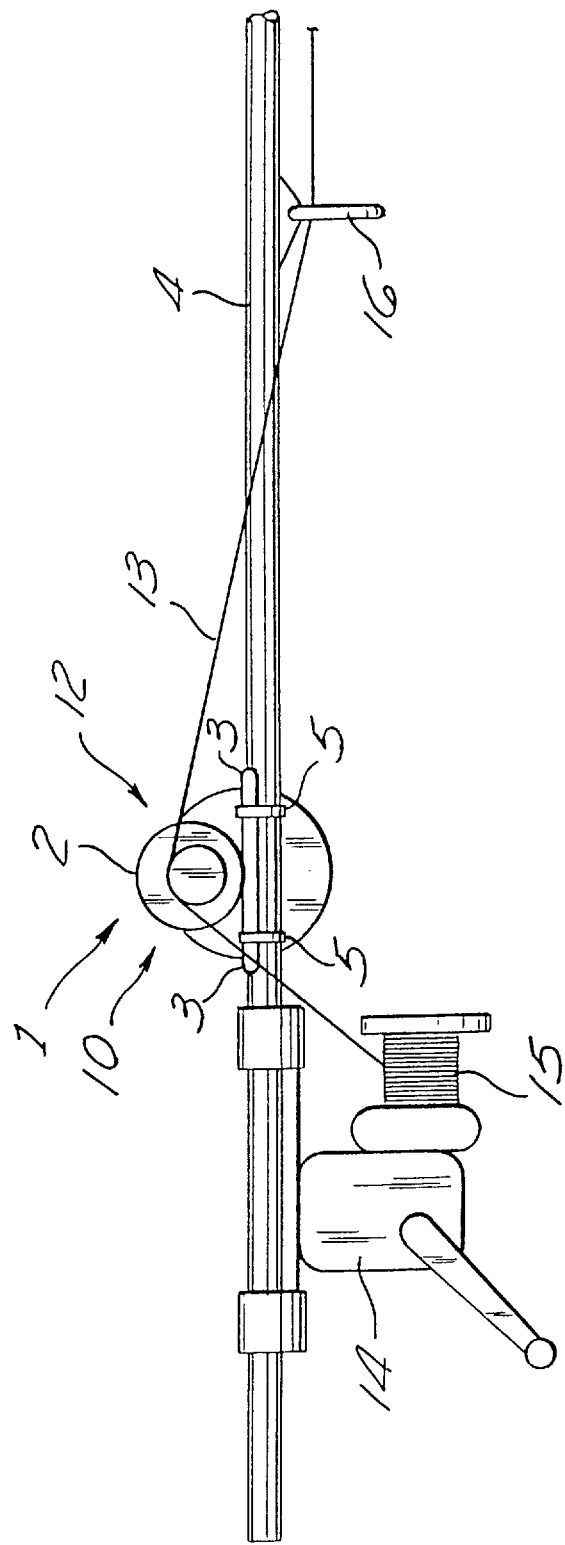
FIG. 1: is a schematic side view illustrating a fishing line release apparatus, according to one possible embodiment of the present invention, when mounted on a fishing rod.

Having regard to FIG. 1 there is shown a fishing line release apparatus generally indicated by arrow 1. The fishing line release apparatus is used for automatically releasing a fishing line when casting.

The fishing line release apparatus 1 has a body member 2 provided with mounting lugs 3 for mounting the apparatus 1 to a fishing rod 4 The mounting lugs 3 are formed integral with the body member 2 of the apparatus 1, and are clamped to the fishing rod 4 by means of two loops 5 which are able to be tensioned by an adjusting plate 6 (see FIGS. 2a and 2b) on each of the lugs 3.

An inclination sensing device is mounted on the body 2 for sensing an inclination of the fishing rod 4, and is generally indicated by arrow 10. The apparatus 1 also comprises or includes a release device generally indicated by arrow 12 for releasably retaining a fishing line 13 relative to the fishing rod 4 and apparatus 1. In the embodiment shown the release device 12 co-operates with a fishing reel 14, which is a fixed spool type reel, to releasably retain the fishing line 13 wound onto a spool 15 thereof. It does this by supporting a portion of the line 13 at a predetermined position relative to the spool 15 and ferrule 16 on the rod 4, so that the line 13 is prevented from unwinding from the spool 15. When the rod 4 is inclined to a predetermined inclination sensed by the inclination sensing device 10, the release device 12 is operated to release the fishing line 13 so that it can freely unwind from the spool 15 of the reel 14.

Figure 2A:
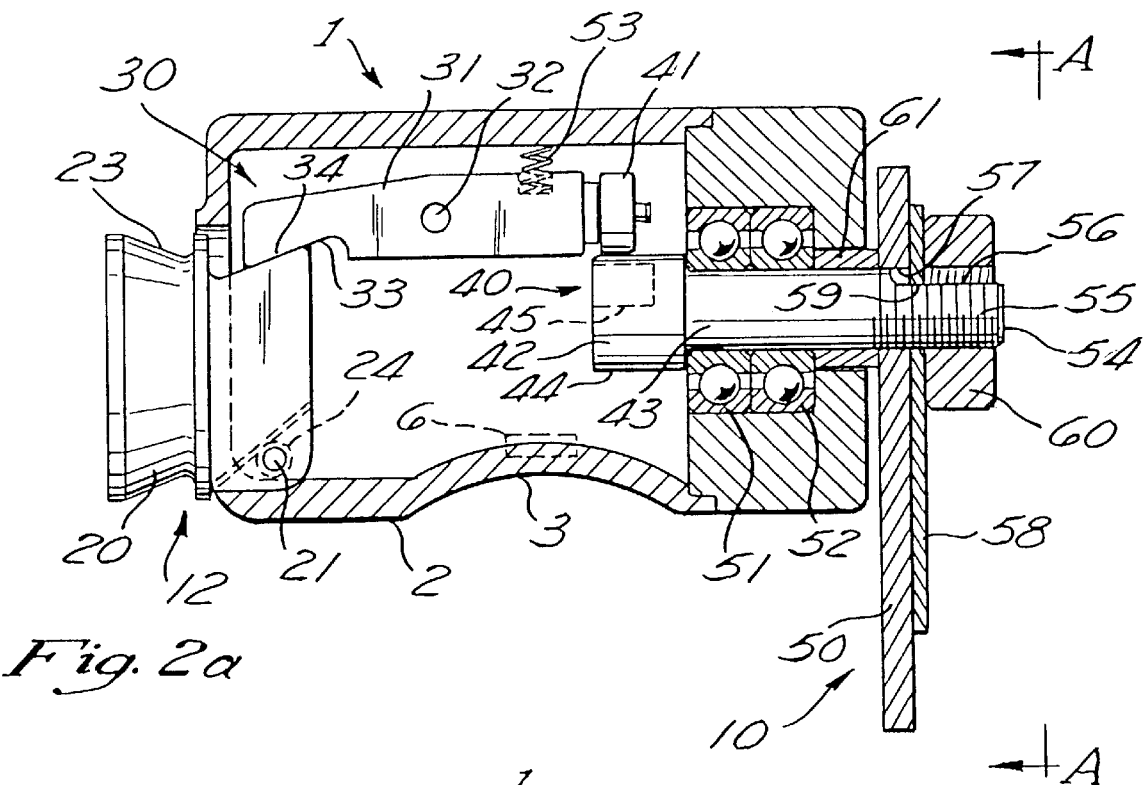
FIG. 2a: is a schematic, cross sectional view of the fishing line release apparatus shown in FIG. 1, and FIG. 2b: is an end view of the fishing line release apparatus in FIG. 2a in the direction of the arrows A—A'.
Figure 2B:
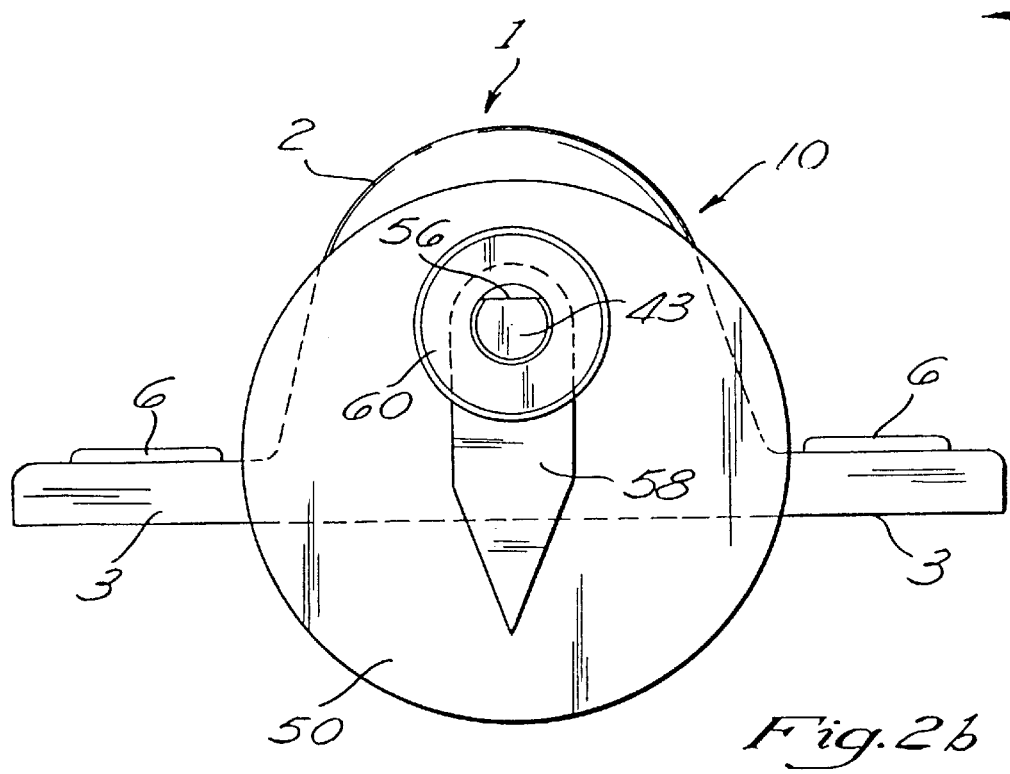

As shown in more detail in FIGS. 2a and 2b wherein components described in FIG. 1 are indicated by the same numeral, the release device 12 comprises an operating member in the form of a line retaining member 20 which is pivotally mounted about a pivot pin 21 so as to pivot between a line retaining condition and a line release condition. When in the line retaining condition as shown in FIG. 1 and FIGS. 2a and 2b, the line retaining member 20 abuts the body member 2 of the apparatus 1. The line retaining member 20 is also provided with a line bearing surface 23 for receiving and retaining the fishing line 13 thereon and/or therearound when in the line retaining position. When moving to the line release condition the line retaining member 20 pivots away from the body member 2 under the biasing force of a spring 24 located by the pivot pin 21, and also under a biasing force due to the tension of the fishing line 13 bearing on the surface 23, whereby the fishing line 13 is free to slide off the surface 23, and be released by the retaining member 20.

There is also provided a retaining/actuating means in the form of a latching device generally indicated by arrow 30 for maintaining the line retaining member 20 in the line retaining condition as shown. The latching device 30 comprises a movable member 31 which is free to pivot about a pivot pin 32. The movable member 31 has at one end thereof, an engaging surface in the form of a notch 33 which engages with a notched portion 34 of the line retaining member 20.

In FIG. 2, the movable member 31 is shown in an engaged condition wherein it is not free to pivot about the pivot pin 32, and whereby the line retaining member 20 is retained by the movable member 31 in the line retaining condition as shown.

The movable member 31 is maintained in the engaged condition by a cam type device generally indicated by arrow 40. The cam type device 40 comprises or includes a bearing 41 mounted on the opposite end of the movable member 31 to the notch 33, and an enlarged diameter portion 42 of a pivot shaft 43. The portion 42 has an outer peripheral cam surface 44 with a recess 45 (shown in dotted outline) formed therein at a predetermined location for accommodating a portion of the bearing 41 therein.

The inclination sensing device 10 comprises a pendulum 50 adjustably attached to the pivot shaft 43. The pivot shaft 43 is rotatably mounted relative to the body member 2 by twin ball bearings 51,52.

In operation, the pivot shaft 43 is rotated by the pendulum 50 as the apparatus 1 is inclined with inclination of the fishing rod 4 until a position where the portion of the bearing 41 may be accommodated in the recess 45 formed in the cam surface 44. When this occurs the movable member 31 is able to pivot about the pivot pin 32 under the urging force of a spring 53, and move to the non-engaged condition.

The pendulum 50 is mounted on an outer end 54 of the pivot shaft 43 opposite to the enlarged diameter portion 42 such that the recess 45 is positioned at a predetermined angle with respect to an axis of the pendulum 50. The predetermined angle should be such that the recess 45 will rotate to accommodate a portion of the bearing 41 when the angle of inclination of the fishing rod 4 is at the optimum time for release of the fishing line 13. That is, when the fishing rod 4 is at a desired or required angle for release of the line 13, and thereby the hook and sinker.

The outer end 54 of the pivot shaft 43 has a threaded tip portion 55, and is also formed with a flat surface 56. In assembling the pendulum 50 on the pivot shaft 63, a sleeve 61 is first slid over the pivot shaft 43. The pendulum 50 is mounted on the outer end 54 of the pivot shaft 43 by sliding an aperture 57 formed within the pendulum 50 over the outer end 54, and then fitting a pointer 58 (having an aperture 59 which engages with the flat surface 56), onto the outer end 54. The assembly is then clamped together by tightening a knurled nut 60 onto the threaded tip portion 55. The angle of the pendulum 50 with respect to the pivot shaft 43 may thus be held at the required angle by holding the pointer 58 while tightening the knurled nut 60. This angle may also be easily adjusted by undoing and re-tightening the knurled nut 60, and hence the timing of the line release may be adjusted as required or as desired.

In use, and with the fishing apparatus 1 attached to the fishing rod 4 as shown in FIG. 1, the line retaining member 20 is pivoted about the pivot pin 21 against the bias force of the spring 24 and clipped into the engaged positioned shown in FIGS. 2a and 2b. That is, the notched portion 34 in the line retaining member 20 is engaged with the notch 33 of the movable member 31. Because the movable member 31 is held in this position by the cam type device 40, the line retaining member 20 is retained in the engaged position shown. The fishing line 13 from the spool 15 of the fixed spool reel 14 is then passed around the line bearing surface 23 of the line retaining member 20 and supported thereby. This is the position that the various components of the fishing line retaining apparatus 1 are in at the time when the fishing rod 4 is brought back prior to flicking or throwing forward, and therefore casting.

When casting, the pendulum 50 swings with the pivot shaft 43 until such time as the cam type device 40 operates, that is, when the recess 45 accommodates the bearing 41. This allows the movable member 31 to pivot about the pivot pin 32 assisted by the force of the spring 53, thereby releasing the line retaining member 20, and therefore the line 13. It is found that the flicking motion of the rod 4 being brought forward is sufficient to pivot the line retaining member 20 about the pivot pin 21, once released from the line retaining condition as described above, thereby releasing the fishing line. This movement is also assisted however by the urging force of the spring 24. Because the positioning the pendulum 50 may be adjusted, the apparatus 1 may be adjustable for use with different rods, or by different fisherman who may have different casting techniques. The pendulum 50 may also be adjusted whereby the fishing line 13 is released at the optimum angle for a particular fishing rod.

It can be seen therefore that one advantage of my invention is that the fishing line is released automatically when casting, and can be adjusted so that the fishing line is released at the optimum time for both timing and distance. Moreover, by utilising my invention, a fisherman's fingers or thumbs do not become cut or blistered by repeated holding down of the fishing line before or when casting.

Aspects of the present invention have been described by way of example only and it should be appreciated that modifications and additions may be made thereto without departing from the scope thereof as defined in the appended claims.

The claims defining the invention are:

1. A fishing line release apparatus for use when casting a fishing line with a fishing rod, said apparatus comprising:
   (i) a body member having a mounting means for mounting said apparatus relative to a fishing rod;
   (ii) inclination sensing means mounted relative to said body member, for sensing an inclination of said fishing rod, and
   (iii) release means for releasably retaining, relative to said fishing rod, a fishing line to be cast by said fishing rod, the arrangement and construction being such that said release means is operated to release said fishing line retained thereby when said inclination sensing means senses a predetermined inclination of said fishing rod.

2. A fishing line release apparatus as claimed in claim 1, wherein said release means comprises:
   (ii) an operating member which is movable between a line retaining condition wherein said line is retained relative to said fishing rod and/or said fishing line release apparatus, and a line release condition wherein said line is released, and
   (ii) a retaining/actuating means whereby said operating member may be retained in said line retaining condition, and only released or moved therefrom when said inclination sensing means senses a predetermined inclination of said fishing rod.

3. A fishing line release apparatus as claimed in claim 2, wherein said release means co-operates with a fishing reel mounted on the fishing rod to releasably retain a fishing line wound onto a spool member of the fishing reel, and whereby said operating member functions to releasably prevent said fishing line from unwinding from said spool member when the operating member is in said line retaining condition, but will allow said fishing line to unwind from said spool member when said operating member is in said line release condition.

4. A fishing line release apparatus as claimed in claim 3, wherein when said fishing reel is a free spooling type reel, and whereby said operating member functions to releasably lock said spool member relative to said fishing rod and/or said fishing line release apparatus when in said line retaining condition.

5. A fishing line release apparatus as claimed in claim 3, wherein when said fishing reel is a fixed spool type reel, and whereby said operating member comprises a line retaining member which functions to releasably support and/or retain said line in said line retaining condition.

6. A fishing line release apparatus as claimed in claim 5, wherein said line retaining member is mounted on said body member and/or said fishing rod, and is movable between said line retaining condition wherein said line is supported and/or retained by said line retaining member, and said line release condition wherein said line is free to slide off or be released from said line retaining member.

7. A fishing line release apparatus as claimed in claim 5 or claim 6, wherein said line retaining member is provided with a line bearing surface for receiving, supporting and/or retaining said line, the arrangement and construction being such that said line retaining member is mounted so as to be pivotal between said line retaining condition and said line release condition, and said line bearing surface is adapted to support said line in said line retaining condition, and release said line as the line retaining member pivots to said line release condition.

8. A fishing line release apparatus as claimed in claim 2, wherein said retaining/actuating means comprises a movable member having an engaging surface, said movable member being movable between an engaged condition wherein said engaging surface engages with a portion of said operating member, and a non-engaged condition wherein said engaging surface disengages with said portion of said operating member.

9. A fishing line release apparatus as claimed in claim 8, wherein said retaining/actuating means further comprises means for maintaining said movable member in an engaged condition until said inclination sensing means senses a predetermined inclination of said fishing rod.

10. A fishing line release apparatus as claimed in claim 9, wherein said inclination sensing means comprises a pendulum mounted on a pivot shaft, said pivot shaft being rotatably mounted relative to said body member of said fishing line release apparatus.

11. A fishing line release apparatus as claimed in claim 9 or claim 10, wherein said means for maintaining said moveable member in said engaged condition comprises a surface formed on and/or relative to said pivot shaft for bearing against a bearing surface formed on and/or relative to said movable member so as to maintain said movable member in an engaged condition over a predetermined swing of said pendulum, and whereby said moveable member is able to move towards said non-engaged condition as a predetermined inclination of said pendulum is being reached.

12. A fishing line release apparatus as claimed in claim 11, wherein said surface formed on said pivot shaft is substantially concentric with an axis of said pendulum over a predetermined arc, said surface having a recess formed therein for accommodating said bearing surface of said movable member, said recess being provided at a predetermined angle with respect to an axis of said pendulum mounted on said shaft, said predetermined angle being determined by the required angle of inclination for release of said fishing line.

13. A fishing line release apparatus as claimed in any one of claim 10 or 12, wherein said pendulum is adjustably mounted on said shaft and said adjustment of said angle is achieved by relocating said pendulum on said shaft.

14. A fishing line release apparatus as claimed in any one of claim 8 or claim 9, wherein said movable member is maintained in said engaged condition by a resilient urging force, and is movable from said engaged condition under the force of an electric solenoid, and said inclination sensing means comprises a mercury switch connected to said electric solenoid such that said solenoid is operated at a predetermined inclination of said mercury switch to cause said movable member to move from said engaged condition to said non-engaged condition to thereby release said line operating member and hence said fishing line.

15. A method of casting a fishing line using a fishing line apparatus, comprising the steps of:

a) providing a fishing line release apparatus comprising:
      1) a body member having a mounting means for mounting said apparatus relative to a fishing rod;
      2) inclination sensing means mounted relative to said body member, for sensing an inclination of said fishing rod; and
      3) release means for releasably retaining, relative to said fishing rod, a fishing line to be cast by said fishing rod, the arrangement and construction being such that said release means is operated to release said fishing line retained thereby when said inclination sensing means senses a predetermined inclination of said fishing rod;

b) mounting said fishing line release apparatus on a fishing rod relative to a fishing reel on which is wound a line to be cast;

c) setting said release means to a line retaining condition;

d) releasably retaining a portion of said fishing line by said release means so that said fishing line is prevented from unwinding from said fishing reel;

e) swinging said rod in a casting motion so that said release means is operated when said inclination sensing means senses a predetermined inclination of said rod to thereby release said fishing line to allow it to unwind from said fishing reel and thus be cast.

* * * * *